July 22, 1958     C. E. PETERSON     2,844,238
FRONT WHEEL CLUTCH MECHANISM FOR MOTOR VEHICLES
Filed March 7, 1955
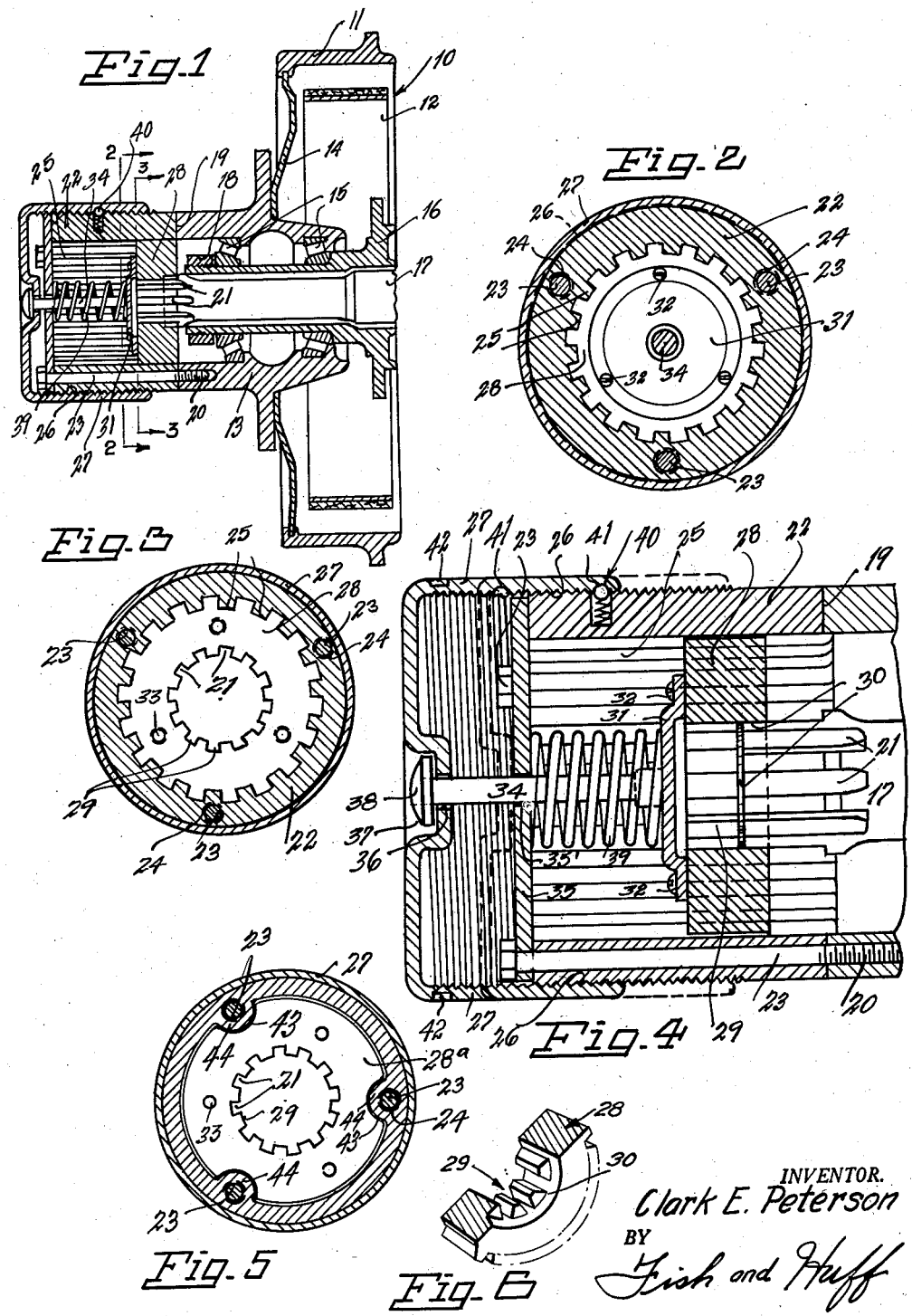
INVENTOR.
Clark E. Peterson
BY
Fish and Huff

United States Patent Office 2,844,238
Patented July 22, 1958

2,844,238
FRONT WHEEL CLUTCH MECHANISM FOR MOTOR VEHICLES

Clark E. Peterson, Spokane, Wash.

Application March 7, 1955, Serial No. 492,726

5 Claims. (Cl. 192—67)

This invention relates to motor vehicle driving means and more particularly to a releasable power connection between a wheel and a driven axle of a motor vehicle.

The primary object of the invention lies in the provision of a selectively operable clutch mechanism for alternately interconnecting and disconnecting a wheel of a vehicle to a driven axle thereof.

Another object of the invention lies in the provision of means for alternately connecting and disconnecting a driving wheel journaled coaxial with a driven axle to said axle by manually controlled means.

Another object of the invention lies in the provision of a novel driving wheel of a motor vehicle which has a clutch member axially slidable within said wheel and fixed for rotation therewith and selectively movable into and out of interconnection with a driven axle of the motor vehicle.

Another object of the invention lies in the provision of an adaptor mechanism which is adapted to be secured to a front wheel of a four-wheel drive automotive vehicle to render the wheel capable of selective connection and disconnection with the driven axle of the motor vehicle.

These and other important objects of the invention will become apparent during the course of the following description.

In the accompanying drawings, forming a part of this specification and in which like numerals are employed to designate like parts:

Figure 1 is a vertical cross section taken through the axis of a driving wheel embodying the present invention and having parts broken away for convenience of illustration;

Figure 2 is a transverse cross section upon an enlarged scale taken at the plane indicated by line 2—2 and looking in the direction of the arrows;

Figure 3 is a transverse cross section on the same scale as Figure 2 and taken on the plane of line 3—3 of Figure 1, looking in the direction of the arrows;

Figure 4 is an enlarged fragmentary vertical cross section of the adaptor secured to the hub housing of the wheel;

Figure 5 is a view similar to Figure 3 and showing a modified clutch member disposed in the hub extension; and Figure 6 is a fragmentary perspective view of the clutch member.

Referring now more particularly to the drawing, I have disclosed a portion of a driving wheel 10 wherein the brake drum 11, containing the conventional brake shoe and lining assemblies 12, is supported on the hub housing 13 by means of a disc 14 forming a part of the brake drum housing. The hub housing 13 is journaled by means of bearings 15 on an axle housing 16 which is conventionally supported on a front wheel steering knuckle (not shown) as is common in motor vehicles having the front driving wheels.

Within the axle housing 16, I disclose a driven axle 17. It will be seen that the wheel 10 is releasably journaled on the axle housing and secured by means of lock nut 18.

In its end face 19, the hub housing 13 is provided with a plurality of spaced internally threaded bolt holes 20 which are adapted to receive threaded bolts for securing a covering plate (not shown) to the hub housing. The driven axle 17 is provided at its outer end with splines 21 which are adapted to fit into the conventional covering plate which has been removed for the application of the present invention.

The present invention consists of an annular hub extension 22 which fits in coaxial end-to-end relationship with the hub housing 13, and is provided with a plurality of bolts 23 which extend through bolt receiving openings 24 formed in the hub extension 22 and are threaded into the sockets 20 to rigidly unite the extension to the hub housing 13. Obviously, in new construction the extension may be formed integral with the housing if so desired.

Internally, the hub extension 22 is splined as seen in Figures 2 and 3 at 25, and upon its outer peripheral face it is threaded at 26 to receive the hub member or cap 27 having its skirt internally threaded to mate therewith. It will thus be seen that as the hub member or cap 27 is rotated, it will move axially of the hub extension and therefore of the wheel, inwardly and outwardly thereof.

Within the hub extension 22 I provide a clutch member 28 which has peripheral splines adapted to cooperate with the splines 25 of the hub extension 22. It will thus be seen that the clutch member 28 is axially movable with relation to the wheel 10 within the limits thereof, considering the hub extension 22 as a portion of the wheel, and yet it is confined against rotary movement with relation to the wheel.

The clutch member 28 is provided with an internally splined central opening or spline-way 29, which is adapted to receive the splines 21 of the driven axle 17 and mate therewith, and thereby interconnect the hub extension 22 and the driven axle 17. It is thus seen that the driven axle 17 may be selectively connected to and disconnected from the driving wheel 10 by means of axially positioning the clutch member 28.

Inspection of Figures 4 and 6 will reveal that the spline-way 29 is relieved at 30 and has an internal annular face at a radius equal to the largest radius of the spline-way and coincident to the circumference of the external annular faces of the splines 21 of axle 17. Therefore the clutch member 28 when shifted to the disengaged or disconnected position as seen in Figure 4 provides a support bearing for the free end of the driven axle 17.

To provide means for manually engaging and disengaging the clutch member 28 with the splines 21, I provide a cap 31 which is here shown to be releasably secured to the clutch member 28 by means of bolts 32, but obviously which may be formed as an integral portion of the clutch member 28, if found desirable. The bolts 32 are threaded into internally threaded openings 33 formed in the clutch member 28. A connecting rod 34 is fixed at one end to the cap 31 and extends axially of the wheel outwardly through a central bore 35' in a cover plate 35 which is held in covering relation to the outer open end of the hub extension 22 by means of the bolts 23. The connecting rod extends outwardly through a central aperture 36 formed in a recess 37 at the axis of the hub cap 27. At its outer end the connecting rod is provided with an enlarged head 38 to bear against the hub cap in the recess 37. The recess is provided as a protective means for the head 38 of the rod 34. This hub cap 27 and rod 34 are therefore associated by a lost motion connection so that the hub member or cap 27 may be moved inwardly to the dotted line position of Figure 4 without regard to rod 34 whereby spring 39 is compressed to urge the clutch member 28 toward mating engagement with splines 21.

It will thus be seen that as the hub member or cap 27 is threaded outwardly off of the hub extension 22, the rod 34 will be drawn outwardly and the clutch member 28 will be moved toward the disengaged position as seen in Figure 4 thereby. When the hub cap is threaded inwardly to the full line position of Figure 1 and the dotted line position of Figure 4, axial movement of the clutch member 28 into engagement with the splines 21 is permitted. To facilitate said engaging movement, I provide said compression spring 39 which is disposed between the cover plate 35 and the cap 31 of the member 28 and normally urges the clutch member 28 into engagement with the splines 21 of the driven axle 17. Therefore the cap 27 may be disposed at the dotted line position of Figure 4 and even though the spline-way 29 and splines 21 do not mate by reason of their being circumferentially offset with relation to each other, the spring will urge the clutch member 28 into engagement therewith upon relative rotation between the wheel 10 and the axle 17.

It will be noted that a spring biased ball lock mechanism 40 is carried by the hub extension 22, and is adapted to cooperate alternately with spaced recesses 41—41 formed in the hub cap 27, thus releasably and alternately locking the hub cap 27 in the inner and outer positions.

Since the initial torque required to rotate the hub cap to disengage the lock 40 from a recess 41 is considerable, I have provided notches 42 which are adapted to receive a spanner wrench and permit said initial movement thereby. If desired, the threads may be sufficiently tight to prevent accidental rotation of the cap and thereby obviate the necessity of a locking mechanism.

In Figure 5 of the drawing, I have shown a modified form of the invention wherein the clutch member 28a is provided with a lesser number of grooves 43 which are adapted to fit about the axially parallel bosses 44 drilled to receive the bolts 23 constituting modified external splines on the clutch member 28 and internal splines on the hub extension 22.

Having thus described my invention, I claim:

1. In a motor vehicle having a driven axle, a driving wheel adapted to be journaled coaxial with said axle; a hub housing coaxial with said wheel; a clutch member movable axially within the limits of said hub housing and fixed against rotation relative thereto; said clutch member being adapted for connection to said axle at one extreme of its axial movement and disconnection therefrom at the opposed extreme, whereby said wheel is adapted to be selectively and releasably associated with said axle; a hub cap threadedly associated with said hub housing and movable axially thereof by means of said threads; and a connecting rod interconnecting said hub cap and said clutch member whereby threaded axial movement of said hub cap imparts axial movement to said clutch member.

2. In a motor vehicle; a driven axle having splines on the free end thereof; a driving wheel journaled coaxial with said axle; a clutch member having a central spline-way adapted to mate with said axle spline; said clutch member being associated with said wheel for axial movement and fixed against rotation relative thereto; a hub cap threadedly associated with said wheel and movable axially thereof; a compression spring disposed to bias said clutch member into mating relation with said clutch splines; and a connecting rod operably interconnecting said hub cap and said clutch member, whereby threaded axial movement of said hub cap effects axial movement of said clutch member into and out of association with said axle.

3. In a motor vehicle having a driven axle, a driving wheel having a hub and adapted to be journaled coaxial with said axle; a hub extension secured coaxial with said hub and having an outer end plate; a clutch member disposed within said hub extension and movable axially therein and fixed against rotation relative thereto; said clutch member being adapted for connection to said axle at one extreme of its axial movement and disconnection therefrom at the opposed extreme, whereby said wheel is adapted to be selectively and releasably associated with said axle; a compression spring disposed between said hub extension cover plate and said clutch member urging said clutch member into connection with said axle; a hub cap threadedly associated with said hub extension and movable axially thereof by means of said threads; and a connecting rod operably interconnecting said hub cap and said clutch member, whereby said clutch member is adapted to be selectively and releasably moved into and out of association with said axle.

4. In a motor vehicle, a driven axle having splines on the free end thereof; a driving wheel journaled coaxial with said axle; a clutch member having a central spline-way adapted to mate with said axle splines; said clutch member being associated with said wheel for axial movement and fixed against rotation in at least one direction relative thereto; a hub member associated with said wheel and movable axially thereof; means urging said clutch member into mating relation with said axle splines; and a connecting rod operably interconnecting said hub member and said clutch member, whereby manual axial movement of said hub member effects axial movement of said clutch member into and out of association with said axle.

5. In a motor vehicle, a driven axle having splines on the free end thereof; a driving wheel journaled coaxial with said axle; a clutch member having a central spline-way adapted to mate with said axle splines; said clutch member being associated with said wheel for axial movement and fixed against rotation in at least one direction relative thereto; a hub member associated with said wheel and movable axially thereof; resilient means biasing said clutch member toward mating relation with said axle splines and said hub member and said clutch member being operably interconnected by a lost motion connection for imparting axial movement from said hub member to said clutch member to compress and release said resilient means, whereby axial movement of said hub member in one direction effects release of said resilient means to urge said clutch member into association with said axle.

References Cited in the file of this patent

UNITED STATES PATENTS

| | | |
|---|---|---|
| 1,536,778 | Denham | May 5, 1925 |
| 2,603,325 | Pickard | July 15, 1952 |
| 2,684,140 | Warn | July 20, 1954 |
| 2,788,103 | Requa | Apr. 9, 1957 |

FOREIGN PATENTS

| | | |
|---|---|---|
| 913,969 | Germany | June 28, 1954 |